May 8, 1923.
S. A. COFFEY ET AL
MOTOR VEHICLE
Filed May 27, 1921
1,454,105
2 Sheets-Sheet 1
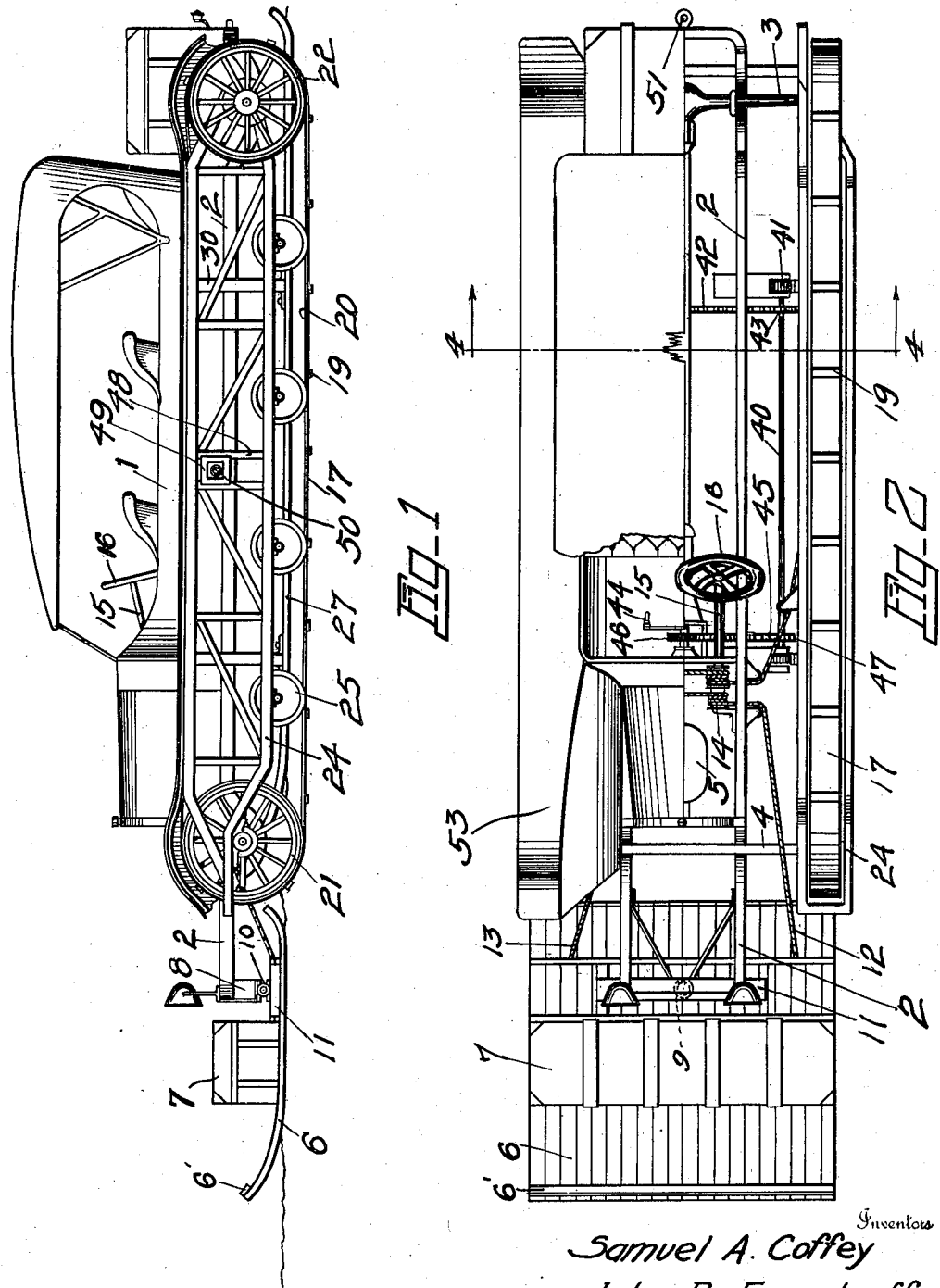
Inventors
Samuel A. Coffey
John B. Ernsdorff
By Herbert E. Smith Attorney May 8, 1923.
S. A. COFFEY ET AL
MOTOR VEHICLE
Filed May 27, 1921
1,454,105
2 Sheets-Sheet 2
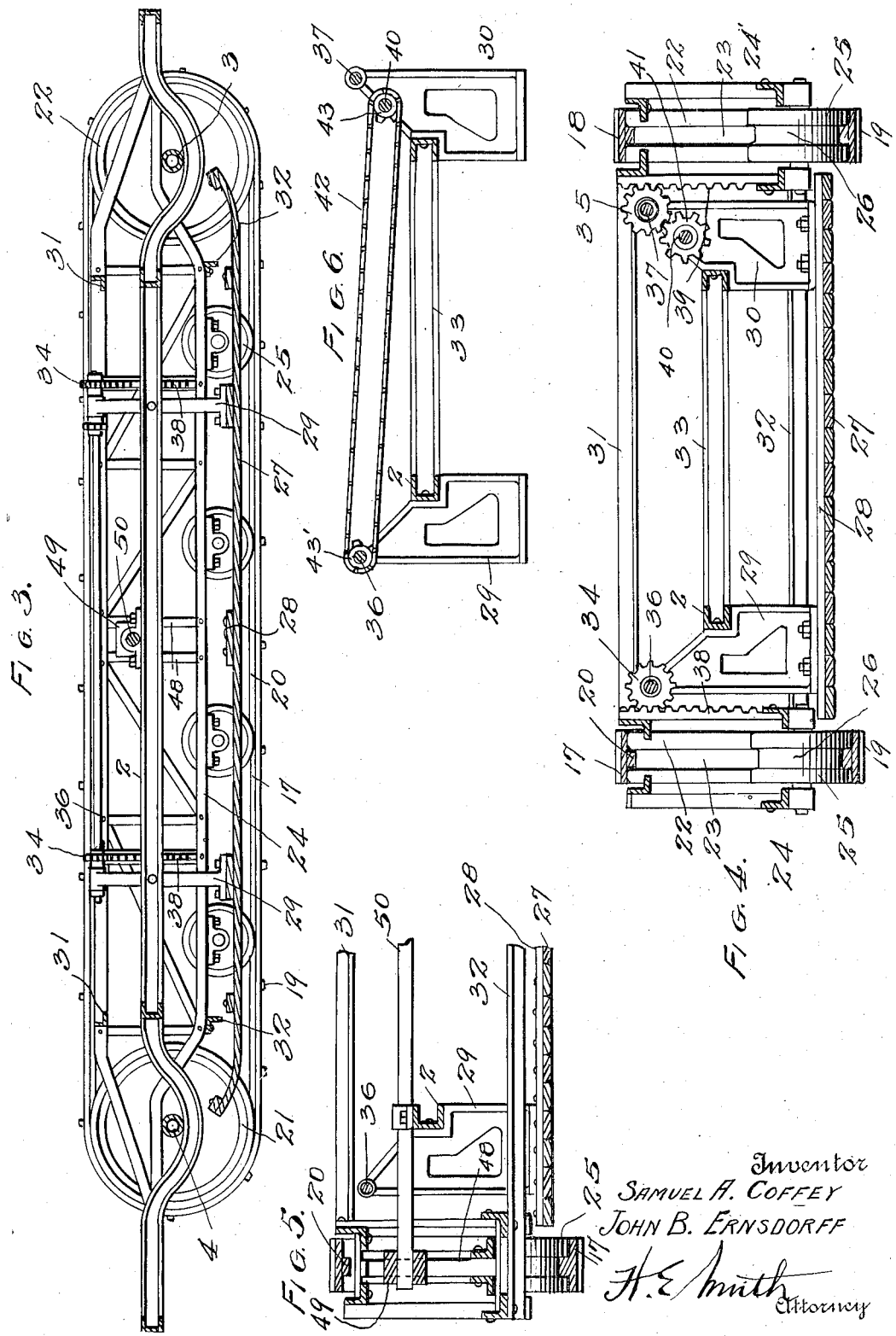
Inventor
SAMUEL A. COFFEY
JOHN B. ERNSDORFF
H. E. Smith
Attorney Patented May 8, 1923.

1,454,105

UNITED STATES PATENT OFFICE.

SAMUEL A. COFFEY AND JOHN B. ERNSDORFF, OF YAKIMA, WASHINGTON.

MOTOR VEHICLE.

Application filed May 27, 1921. Serial No. 472,991.

*To all whom it may concern:*

Be it known that we, SAMUEL A. COFFEY and JOHN B. ERNSDORFF, citizens of the United States, residing at Yakima, in the county of Yakima and State of Washington, have invented certain new and useful Improvements in Motor Vehicles, of which the following is a specification.

Our present invention relates to improvements in motor vehicles of the sled type designed especially for use in traveling over snow covered ground, and embodying traction devices of the endless belt variety for frictional contact with the snow, which vehicle, in addition to a steering sled, may also be steered by driving in connection with the traction devices.

The primary object of the invention is the provision of a vehicle of this type which is comparatively inexpensive in its equipment, is simple in construction and operation, and is designed with a view to shifting the load from the traction devices and withdrawing said devices from operative position in order that the vehicle may coast or glide over the snow surface on supporting and steering sleds or toboggans.

With the above objects in view the invention consists in certain novel combinations and arrangements of parts as will be hereinafter more fully described and claimed.

In the accompanying drawings we have illustrated one complete example of the physical embodiment of our invention, wherein the parts are combined and arranged according to the best mode we have thus far devised for the practical application of the principles of our invention.

Figure 1 is a view in side elevation of a motor vehicle embodying our invention.

Figure 2 is a partial top plan view of the vehicle, in which a portion of the body is removed for convenience in illustrating parts of the vehicle.

Figure 3 is a longitudinal sectional view through the chassis or main frame of the vehicle showing the relation of the sled portion to the side frames, and connecting parts.

Figure 4 is a transverse sectional view at line 4—4 of Figure 2.

Figure 5 is a transverse sectional view at one side of the chassis showing the guide means for the adjustable sled.

Figure 6 is a detail view showing the operating sprocket chain and wheels for the sled.

In the preferred form of the invention as shown in the drawings we have illustrated an automobile of the passenger car type of which the body is designated as 1, provided with a chassis or frame 2, and equipped with rear driving axle 3 and front axle 4, the former being driven from the motor indicated at 5.

At the forward end of the car and extended at the front thereof we utilize a steering sled of the toboggan type indicated as a whole by the numeral 6 and made up of longitudinally extending wood strips and transverse cleats 6'. A structure 7 on the top of the steering sled may be utilized for seats or for carrying freight and forms a supporting frame for the members of the steering sled.

At the forward end of the chassis 2 a steering head 8 is provided for the steering sled, which extends vertically and downwardly beneath the chassis, and at 9 a swivel joint is utilized for horizontally turning or swinging the sled on the head as a center in steering the vehicle, while vertical oscillation of the sled is afforded by the presence of a pivotal joint 10 below the swivel joint. In this manner the sled is flexibly supported from the steering head and may tilt up and down at the front and rear of the steering head when passing over irregularities in the snow surface.

A base block 11 is fixed on the sled beneath the steering head, and to this block are attached the opposed ends 12 and 13 of the steering cable which is wound or coiled upon the drum 14 on the steering post 15, and the latter may be turned by the steering wheel 16 as usual in steering.

At the sides of the vehicle are two traction devices each comprising an endless belt as 17 and 18 with friction cleats 19 arranged transversely thereof, and these belts, which are fashioned with inner longitudinally extending ribs 20 are passed over the front idle wheels 21 and the rear driving wheels 22, the former on the front axle 4 and the latter on the driving axle 3. Each of the four wheels is fashioned with annular grooves 23 in which the guide ribs 20 fit and by means of this rib and groove construction lateral slipping of the endless belts is prevented especially when the vehicle is traveling on a hill side.

The laterally disposed traction devices are provided with longitudinally extending frames 24 upon which intermediate idler or guide wheels 25 are journaled which bear down upon the lower stretch of the traction belts and hold them in operative position with relation to the snow surface. The idlers or guide wheels, as shown in Figure 4, are also fashioned with circumferentially extending grooves 26 for guiding the belts by co-action with the ribs 20. By the utilization of the traction devices driven from the motor 5 through the rear axle 3, the vehicle may be propelled over the snow surface, and in usual manner the vehicle may be steered by driving by varying the tractive force of the two traction devices, or by driving said devices in opposite directions in well known manner.

Beneath the body of the vehicle is disposed a main supporting sled 27, made up of longitudinally disposed wood strips that are secured by cross or transverse cleats 28, and at the front and rear of this sled are arranged pairs of transverse plates 29 and 30 spaced in aligned pairs and erected vertically over the top of the sled to which they are bolted. The two side frames 24 of the traction devices are rigidly connected by transverse bars 31 and 32, in Figure 4, and the two transverse plates 29 and 30 are rigidly connected and braced by the transverse bar 33 to form a rigid and stable structure upon which are journaled a pair of rack wheels 34 and 35 on their respective shafts 36 and 37. These rack wheels engage the rack bars 38 and 39, four in number and arranged in pairs at the front and rear of the longitudinal center of the load of the vehicle. The rack bars are vertically disposed and attached to the side frames 24 24' of the traction devices, and are utilized for shifting the load or weight of the vehicle from the sled or toboggan to the traction devices, or vice versa, by relative movement of the sled or toboggan and frames.

The longitudinally extending rack shafts 36 and 37 with their four rack wheels in pairs 34 and 35 are revolved through the medium of the adjusting shaft 40, which is provided with a pair of spaced wheels or gears 41 to directly drive the gears or rack wheels 35, and a driven sprocket chain 42 extends transversely of the sled between the sprocket wheel 43 on shaft 40 and a similar sprocket wheel 43' on the shaft 36 to transmit power to the latter shaft. The adjusting shaft 40 is revolved by hand from crank 44 (Figure 2) through sprocket chain 45, a sprocket wheel at 46, and a second sprocket wheel 47 on the shaft 40, suitable connection being made to permit relative movement of the two elements, the sled and the traction devices.

For guiding the relative movement of the adjustable sled with relation to the traction devices, we utilize, at the approximate longitudinal center of the side frames 24 24', spaced upright guide bars 48 arranged in pairs, and with these guide bars a slide block 49 at each end of a transverse bolster 50 co-acts. The bolster is firmly fixed to the sled 27 of the motor vehicle and the slide blocks are flanged or grooved to slide between the guide bars 48 of the two side frames thus guiding and stabilizing the relative movement of the parts. By the construction thus described the hand crank 44 may be turned, and through the rack and gear connections the sled and traction devices may be relatively moved to depress the sled below the traction device. In this position the power may be cut off from the motor 5 and the weight of the motor vehicle is carried on the toboggan or sled 27 and steering sled 6 and the vehicle permitted to coast and be steered as usual. By elevating the sled 27 above the traction devices a part of the load may be shifted from the sled to the traction devices which are now located in operative position below the under surface of the sled. The belts of the traction devices are driven from the motor 5 and the vehicle is propelled by the frictional contact of the traction belts with the snow surface. The steering sled may be utilized, or if desired the steering may be accomplished by the driving devices or traction devices operating at varying speeds, or operating in reverse directions as usual.

As before stated the vehicle may be employed for carrying passengers and freight, and may also be utilized for towing or hauling a second or a third vehicle, the latter being attached or connected to the front vehicle at the rear draft device or eye 51 in Figure 2.

The usual fenders or guards 53, and other accessories necessary or desirable for the equipment of the vehicle are provided, and the type of body, chassis, and driving motor or mechanism employed are those conforming to any well known make of automobiles.

From the above description taken in connection with our drawings it is apparent that we have provided a motor vehicle which fulfills the conditions and objects set forth to be accomplished in the construction of our vehicle, and it will be understood that various changes and alterations may be made in the invention as exemplified, within the scope of our claims, without departing from the spirit of our invention.

Having thus fully described our invention, what we claim as new and desire to secure by Letters Patent is:—

1. The combination in a motor vehicle of the sled type having a main frame, side frames and traction wheels and belts supported in said side frames, of a sled fixed to the main frame, side plates on the sled each having a rack wheel, rack bars on the side frames coacting with said rack wheels, and means on said vehicle for revolving the wheels to change the relative position of the side frames and sled.

2. The combination in a motor vehicle with a main frame and side frames and traction devices in said side frames, of a sled fixed to the main frame and a transverse bolster thereon, a slide block at each end of said bolster, vertical guide bars in said side frames for said blocks, and means for changing the relative position of the side frames and sled.

3. The combination in a motor vehicle with a main frame and side frames and traction devices in the side frames, of a sled fixed to the main frame, transverse plates on said sled and rack wheels on said plates, rack bars on the side frames co-acting with said wheels, and means for moving said rack wheels, a transverse bolster on the sled, a slide block at each end of said bolster, and vertical guide bars in said side frames for said blocks.

In testimony whereof we affix our signatures.

SAMUEL A. COFFEY,
JOHN B. ERNSDORFF.